United States Patent
Gupta et al.

(10) Patent No.: US 7,460,531 B2
(45) Date of Patent: Dec. 2, 2008

(54) METHOD, SYSTEM, AND PROGRAM FOR CONSTRUCTING A PACKET

(75) Inventors: Divya Gupta, Phoenix, AZ (US); Hassan Fallah-Adl, Chandler, AZ (US); Salil Phadnis, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 898 days.

(21) Appl. No.: 10/695,376

(22) Filed: Oct. 27, 2003

(65) Prior Publication Data

US 2005/0089033 A1 Apr. 28, 2005

(51) Int. Cl.
*H04L 12/28* (2006.01)
(52) U.S. Cl. .................... 370/389; 370/474
(58) Field of Classification Search ......... 370/389–393, 370/474
See application file for complete search history.

(56) References Cited

U.S. PATENT DOCUMENTS

| | | | | |
|---|---|---|---|---|
| 5,446,738 | A * | 8/1995 | Kim et al. | 370/395.42 |
| 6,032,190 | A | 2/2000 | Severns et al. | |
| 6,256,071 | B1 * | 7/2001 | Hiroi | 348/553 |
| 6,804,815 | B1 * | 10/2004 | Kerr et al. | 718/100 |
| 2001/0053148 | A1 * | 12/2001 | Bilic et al. | 370/389 |
| 2002/0163916 | A1 * | 11/2002 | Oskouy et al. | 370/395.31 |
| 2004/0184457 | A1 * | 9/2004 | Gregorio et al. | 370/392 |

FOREIGN PATENT DOCUMENTS

| | | |
|---|---|---|
| CA | 2317165 | 3/2001 |
| EP | 1 124 362 | 8/2001 |
| EP | 1359727 | 11/2003 |
| WO | WO 01/86869 | 11/2001 |
| WO | WO 02/15495 | 2/2002 |

OTHER PUBLICATIONS

PCT International Search Report and Written Opinion, Jan. 25, 2005, for International Application No. PCT/US2004/035077.
Taiwan Official Letter, Dec. 19, 2005, for Taiwan Patent Application No. 93132363 [English Translation].
Infiniband Trade Association (IBTA), "InfiniBand Architecture-Specification vol. 1", Release 1.1, Nov. 6, 2002, pp. 1-130, 220-567 (Ch. 1-3, 9-11).
Kashyap, V., "IP over InfiniBand (IPoIB) Architecture", *Internet Draft*, © The Internet Society 2001, Jun. 2003, pp. 1-23.
PCT International Preliminary Report on Patentability (IPRP) and Written Opinion, May 11, 2006, for International Application No. PCT/US2004/035077.
German Patent Office Action, German Patent App. No. 2004 002 043.3-31, Apr. 29, 2008.

* cited by examiner

*Primary Examiner*—Chi H. Pham
*Assistant Examiner*—Phuc Tran
(74) *Attorney, Agent, or Firm*—Konrad Raynes & Victor LLP; David W. Victor

(57) ABSTRACT

Provided are a method, system, and program for constructing a packet. A request to construct one packet is received, including information on at least one header and a payload to include in the packet. The at least one header for the received request is generated and the generated at least one header is written in a first queue. The payload is requested to include in the packet and the received payload is written to a second queue. The generated at least one header and payload are read from the first and second queues and the read at least one header and payload are included in the packet.

34 Claims, 4 Drawing Sheets

METHOD, SYSTEM, AND PROGRAM FOR CONSTRUCTING A PACKET

BACKGROUND OF THE INVENTION

1. Field of the Invention

The present invention relates to a method, system, and program for constructing packets.

2. Description of the Related Art

In a network environment, a network adaptor on a host computer transmits and receives packets using a packet transmission protocol, such as Ethernet, Fibre Channel, Infiniband, Transmission Control Protocol and Internet Protocol (TCP/IP), Internet Small Computer System Interface (iSCSI), etc. Often, the host computer operating system includes a device driver to communicate with the network adaptor hardware to manage Input/Output (I/O) requests to receive and transmit over a network. Data packets received at the network adaptor would be stored in an available allocated packet buffer in the host memory. The host computer further includes a transport protocol driver to process the packets received by the network adaptor that are stored in the packet buffer, and access any I/O commands or data embedded in the packet.

The Infiniband architecture allows for point-to-point communication among connecting multiple independent processor platforms, I/O platforms and I/O devices. Each end point that communicates using the Infiniband architecture maintains one or more queue pairs, where each queue pair includes a send queue and receive queue. A channel adaptor in a host system receives work requests from the host processor that are placed in the send queue. The channel adaptor processes the send queue and translates the work request to one or more packets having headers and payload to transmit to a receive queue on a target I/O node. When a node receives a message, the message is placed in the receive queue. A node maintains a queue pair for each remote node with which it communicates to use the send and receive queues for communication with that specific node.

The end points communicate information to each other through messages transmitted through the queue pair queues, where each message consists of one or more packets. In the Infiniband protocol, each packet has one or more transport headers, may contain a packet payload of the transmitted data, and has one or more error correction codes, such as cycle redundancy check (CRC) bytes.

A channel adaptor assembles the headers and payload into a packet using a single queue for both the headers and payload. In such systems, the channel adaptor would assemble a header in the queue and when the payload is available in the same queue, combine the headers and payload into a packet. Such techniques require sequential processing of first the headers and then the payload to combine into a packet. The error correction code is added after adding the one or more headers and payload to the packet. If there are delays in receiving the payload from the host, then the channel adaptor must wait until the payload is received for the current packet being constructed before generating further headers. Delays in receiving the payload may result in latency delays between consecutive packet builds.

BRIEF DESCRIPTION OF THE DRAWINGS

Referring now to the drawings in which like reference numbers represent corresponding parts throughout.

DETAILED DESCRIPTION OF EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
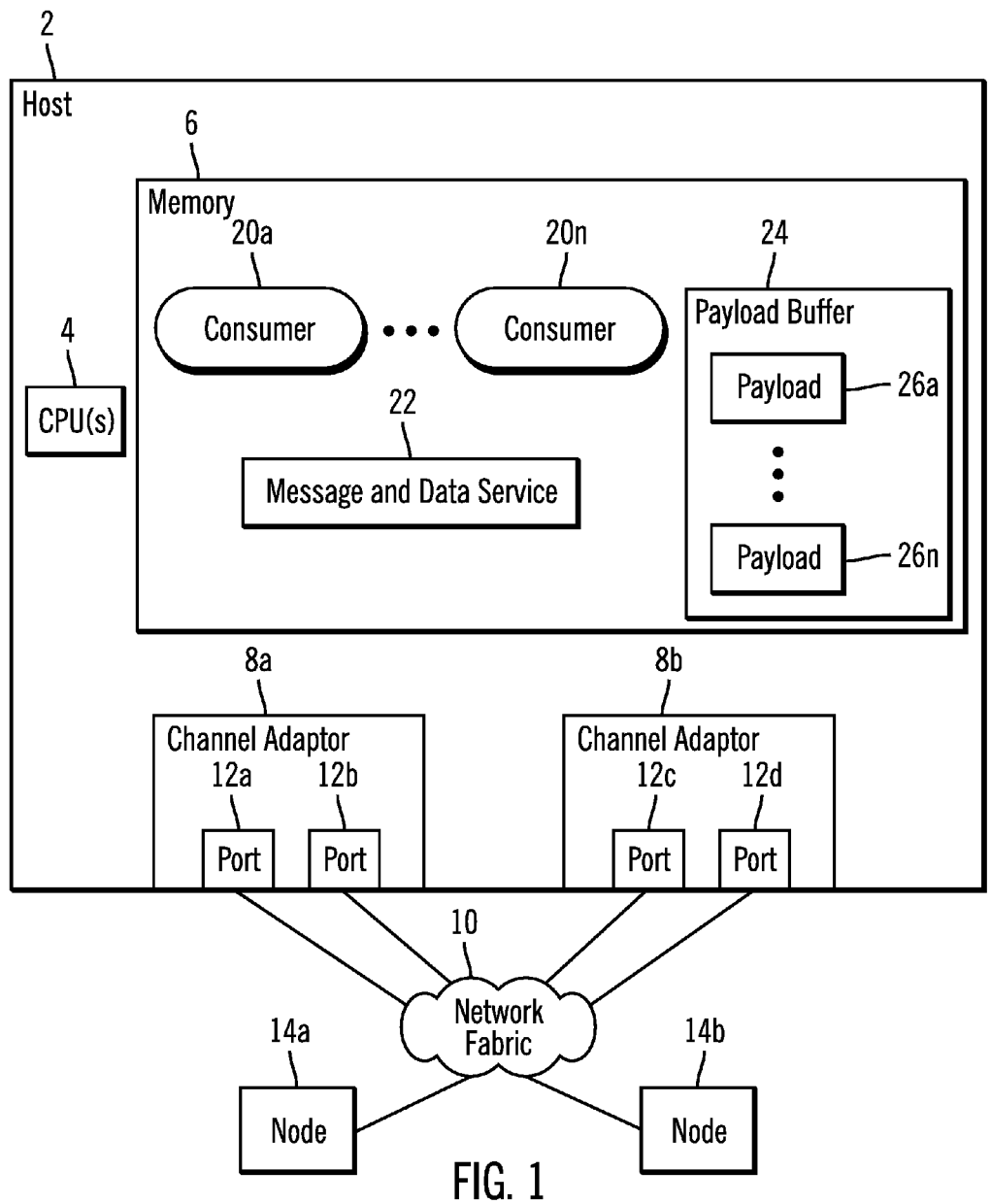
FIG. 1 illustrates a computing environment in which embodiments of the invention are implemented.

FIG. 1 illustrates a computing environment in which aspects of the invention may be implemented. A host 2 includes one or more central processing units (CPUs) 4 and a memory 6. The host 2 includes one or more channel adaptors 8a, 8b (two are shown). Each channel adaptor 8a, 8b includes one or more ports 12a, 12b and 12c, 12d (two are shown on each adaptor) that connect to a network fabric 10, where each port 12a, 12b, 12c, 12d comprises a node in the network 10 fabric. The channel adaptors 8a, 8b are used to communicate with additional nodes 14a, 14b on the network, where each additional node comprises a port of a channel adaptor on a remote device.

The CPU(s) 4 execute one or more processes and threads in the host memory 6, which are referred to as consumers 20a . . . 20n, where each consumer may comprise any process or function capable of generating work requests to the channel adaptors 8a, 8b, where the work requests include information on packets to transmit over the network 10. A message and data service 22 executes within the host 2 operating system (not shown) and provides an interface between the consumers 20a . . . 20n executing in the host 2 and the channel adaptors 8a, 8b. In this way, the message and data service 22 functions as a device driver interfacing between the channel adaptors 8a, 8b and the host system 2. The memory 6 further includes a payload buffer 24 that stores payloads 26a . . . 26n to include in packets that the channel adaptors 8a, 8b will transmit over the network 10. The consumers 20a . . . 20n would specify in the work request transmitted to one channel adaptor 8a, 8b a payload 26a . . . 26n in the payload buffer 24 to transmit. Header information for the packet may also be specified in the work request. Further details of the Infiniband architecture in which embodiments may be implemented, such as the embodiment of FIG. 1, are described in the publication "Infiniband Architecture Specification Volume: Release 1.1", dated Nov. 6, 2002 (Copyright Infiniband Trade Association), which publication is incorporated herein by reference in its entirety.

Figure 2:
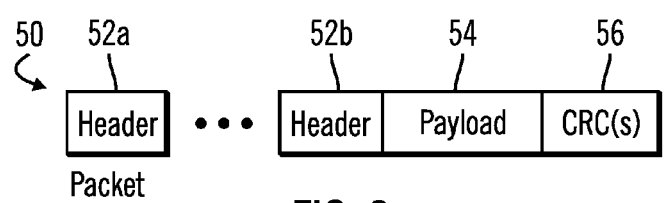
FIG. 2 illustrates a format of a packet in a manner known in the prior art.

FIG. 2 illustrates an example of a format of a packet that the channel adaptors 8a, 8b would transmit in a manner known in the art. Each packet 50 includes one or more headers 52a . . . 52n (multiple are shown), a payload, and one or more error correction codes CRCs 54. A packet 50 may also be transmitted without a payload 54.

Figure 3:
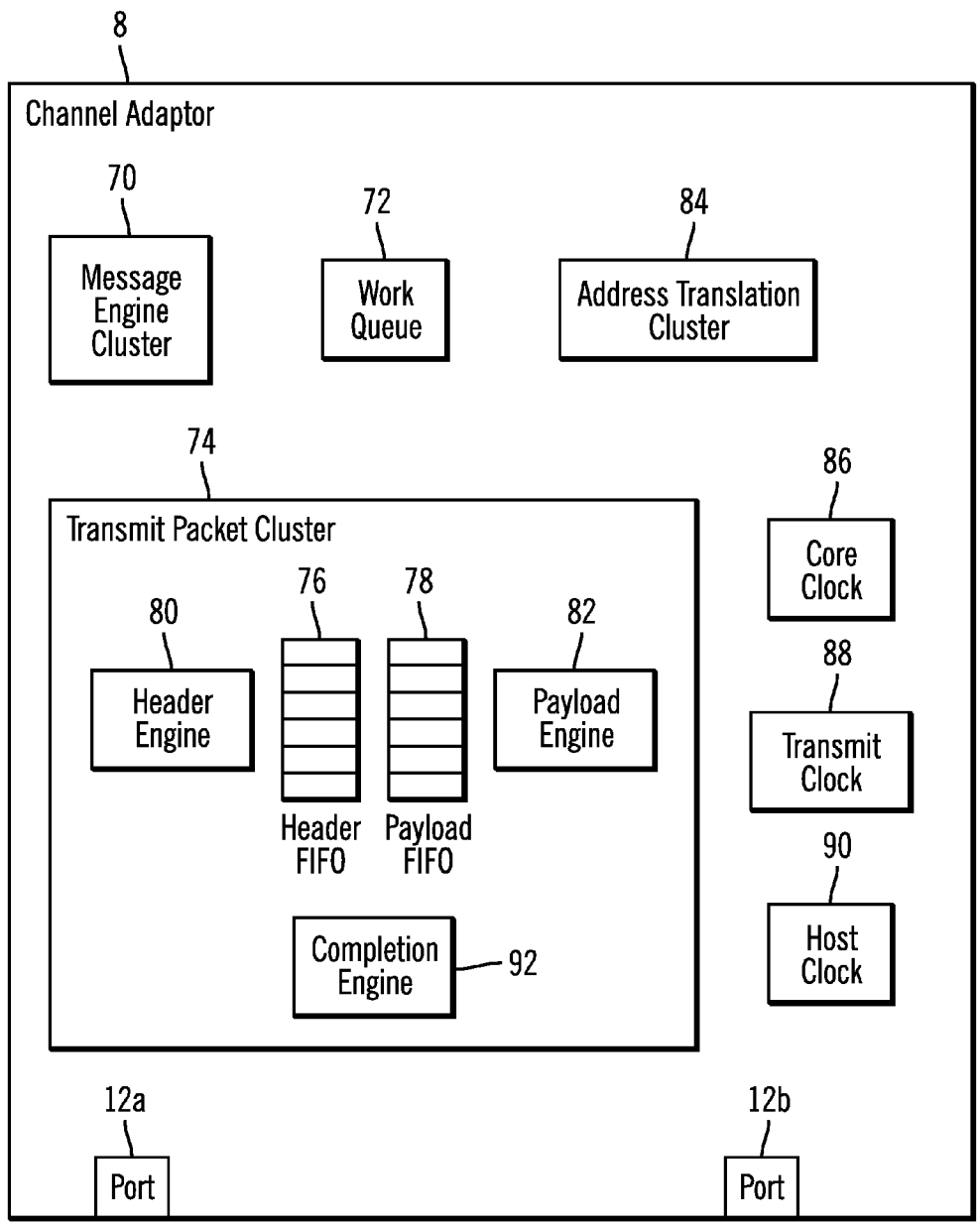
FIG. 3 illustrates further detail of the channel adaptor in accordance with embodiments of the invention.

FIG. 3 illustrates further details of the architecture of a channel adaptor 8, such as channel adaptors 8a, 8b, in accordance with described embodiments. The components of the channel adaptor 8 may be implemented within the logic of an Application Specific Integrated Circuit (ASIC) or other hardware device. A message engine cluster 70 receives work requests from the consumers 20a . . . 20n through the message and data service 22, and queues the work request as a work request element in a work queue 72. The message engine cluster 70 would communicate a queued work request to a transmit packet cluster 74, which comprises the logic that constructs the packet 50. The transmit packet cluster 74 maintains two queues, a header First-in-First-Out (FIFO) queue 76 and a payload FIFO queue 78 to allow for separate queuing and processing of headers and payloads for packets being constructed. A header engine 80 builds headers for one or more packets and queues the built headers in the header FIFO queue 76. A payload engine 82 requests a payload 26a . . . 26n from the payload buffer 24 in the host memory 6 through the address translation cluster 84 and queues received payloads 26a . . . 26n in the payload FIFO queue 78. The payload engine 82 would send payload requests to an address translator cluster 84, which would fetch a packet payload 26a . . . 26n from the system memory 6 and return to the payload engine 82.

In certain embodiments, the channel adaptor 8 implements at least three clocks, a core clock 86, a transmit clock 88, and a host clock 90, such that the operations performed by the different components can operate in different clock domains. For instance, the header engine 80 may write headers to the header FIFO 76 based on the core clock 86 domain and header data may be read out of the header FIFO 76 based on the transmit clock 88 domain. The payload engine 82 may write payloads received through the address translation cluster 84 to the payload FIFO queue 78 at the host clock domain 90 and data may be read from the payload FIFO queue 78 at the transmit clock domain 88. Whenever the header engine 80 and payload engine 82 complete the placement of a header and payload, respectively, in the header 76 and payload 78 queues, they generate a signal to a completion engine 92. The completion engine 92 keeps track of all valid headers and payloads in the queues 76 and 78, and reads out the headers and payloads on the transmit clock 88 to construct the packets.

A plurality of virtual lanes may be implemented in each physical link or port 12a, 12b, 12c, 12d. A virtual lane represents a set of transmit and receive buffers in a port. In certain embodiments, each FIFO queue 76 and 78 may be divided into regions, one for each virtual lane, to store headers and payloads, respectively, for the packets being constructed to transmit through a virtual lane. In this way, packets may be separately constructed for the different virtual lanes so that heavy traffic on one does not block another lane.

Figure 4:
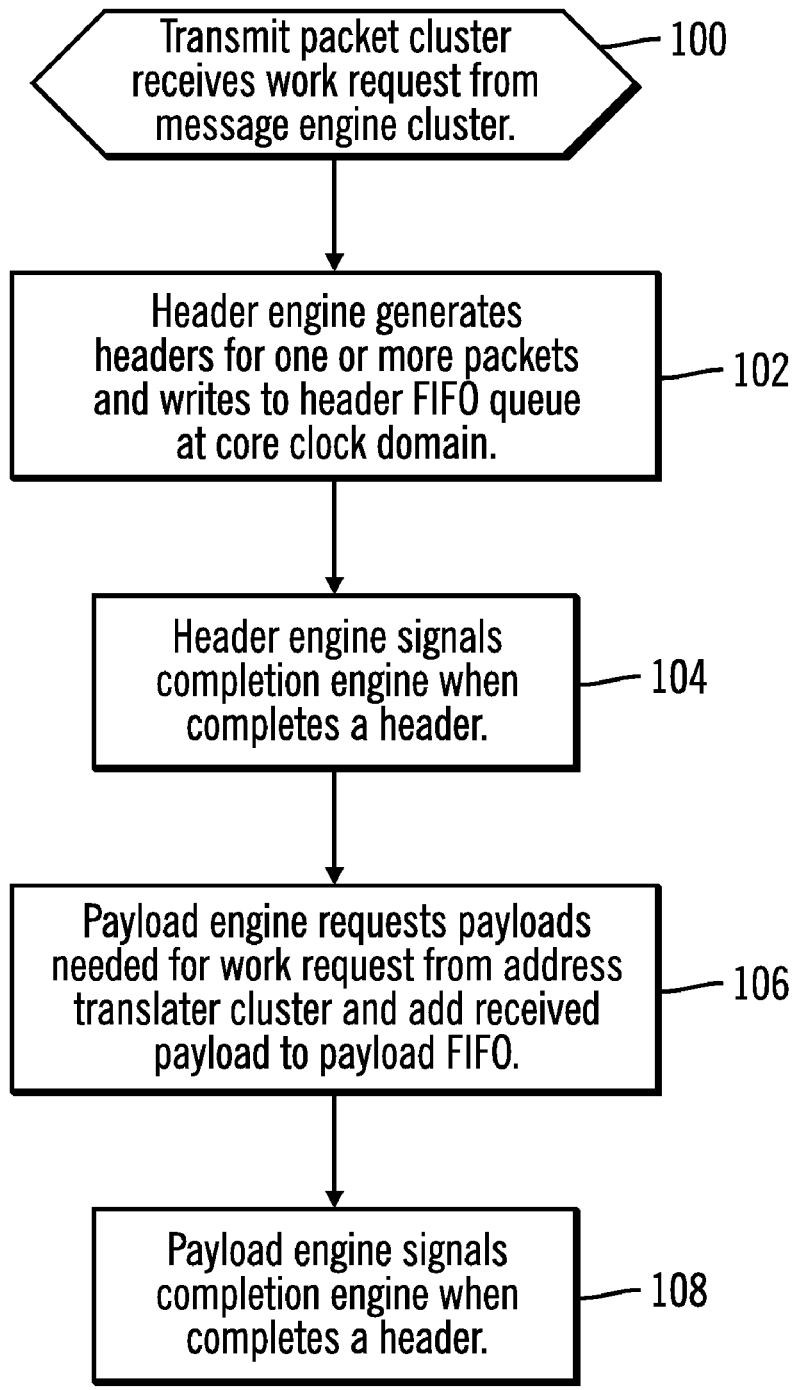
FIGS. 4 and 5 illustrate operations performed to construct a packet in accordance with described embodiments of the invention.
Figure 5:
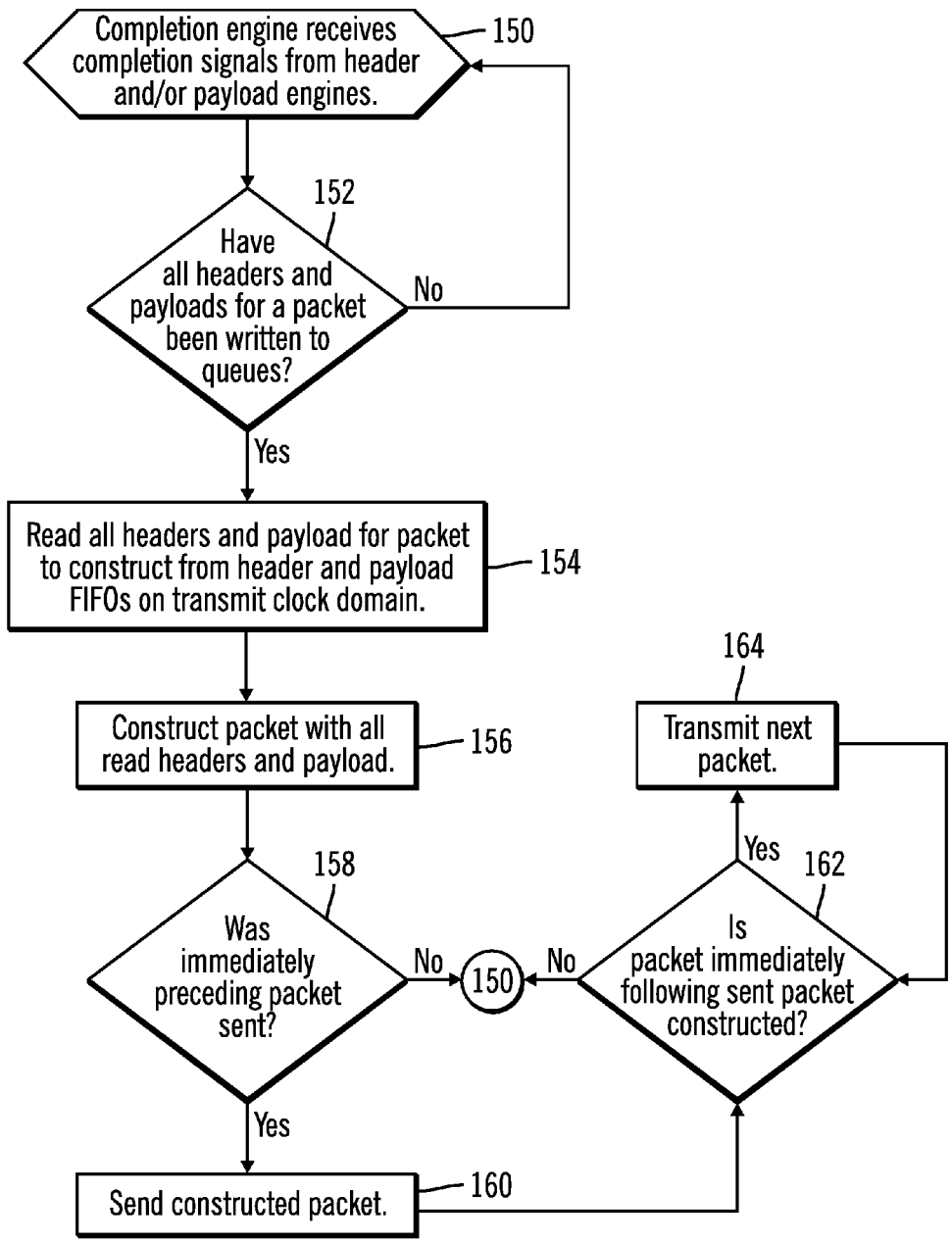

FIGS. 4 and 5 illustrate operations performed by the components in the transmit packet cluster 74 to generate a packet 50 (FIG. 2) for a work request submitted by a consumer 20a . . . 20n (FIG. 1), where the work request contains all information needed to complete the task, such as payload and header information. With respect to FIG. 4, the transmit packet cluster 74 receives (at block 100) a work request from the message engine cluster 70 queued in the work queue 72 to generate packets 50. The header engine 80 generates (at block 102) one or more headers for the one or more packets to generate as part of the work request and writes the generated headers to the header FIFO queue 76 at the core clock 86 domain. Upon completing the writing of a header to the header queue 76, the header engine 80 transmits (at block 104) a complete signal to the completion engine 92 indicating that a header has been completed. The signal would indicate the packet for which the header was generated to allow the completion engine 92 to track the headers and payloads added to the queues 76 and 78, which are available to add to the packet being constructed.

In response to the work request, the payload engine 82 requests (at block 106) one or more payloads needed for the work request from the address translator cluster 84, and writes the subsequently received payload(s) to the payload FIFO 78 at the host clock 90 domain. The payload engine 82 signals the completion engine 92 when a received payload is written to the payload FIFO 78, where the signal would indicate the packet to include the written payload.

FIG. 5 illustrates operations performed by the completion engine 92 in response to receiving a completion signal from the header engine 80 or payload engine 82. Upon receiving (at block 152) a completion signal, the completion 92 determines (at block 152) whether all the headers or headers and payload for a packet have been written to the FIFO queues 76 and 78. If so, then the completion engine 92 reads (at block 154) all the headers and payload, if there is a payload, for a packet from the header 76 and payload 78 FIFO queues on the transmit clock 88 domain. The completion engine 92 then constructs (at block 156) the packet with all the read one or more headers and payload, if the packet includes a payload. If (at block 158) the immediately preceding packet was sent, then the completion engine 92 sends (at block 160) the completed packet down one of the ports 12a, 12b, or virtual lanes for one of the ports. If (at block 158) the immediately preceding packet was not sent, then the currently constructed packet cannot be sent without the preceding packet in the packet ordering being sent. In such case, control proceeds back to block 150 to await the construction of further packets. After sending a constructed packet (at block 160), the completion engine 92 determines (at block 162) whether the next packet in the sequence of packets has been constructed. If so, then the next packet is transmitted (at block 164). Otherwise, if the next packet to transmit has not yet been transmitted, then control proceeds back to block 150. After a packet is transmitted at block 164, control proceeds back to block 162 to determine whether the next packet to transmit has been constructed and is available for transmission.

With the described embodiments, the headers and payloads are constructed in separate queues to allow the channel adaptor to generate payloads and headers in parallel and out of packet sequence. For instance, if the header is generated, then the header engine may continue to generate additional headers for further packets even if the payload for the generated header has not yet been received. When the payload for the generated header is received and the completion engine 92 signaled by the payload engine 82, then the packet may be assembled. Further, the headers for the subsequent packets may have already been generated and buffered in the header FIFO while waiting for the payload to be received for the current packet to send. Buffering headers for subsequent packets allows those subsequent packets to be immediately assembled because their headers and payload are available in the header FIFO queue. Further, payloads may be received out of order before the header is complete. In this way latencies due to delays in accessing the payload or generating headers does not delay preparing the payload and headers for further packets.

Additional Embodiment Details

The described embodiments for constructing packets may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain described embodiments utilize the Infiniband architecture for transferring packets, using separate queues for the headers and payloads. The described embodiments for constructing packets may apply to any packet transfer protocol, such as Ethernet, iSCSI, TCP/IP, etc.

In described implementations, the generated packets were intended for transmittal over a network. In alternative embodiments, the packets may be intended for transmittal over a bus to another device.

In Infiniband embodiments, the work queue 72 may be implemented as queue pairs, where each queue pair includes a send queue and receive queue. Work requests from the consumer to transmit packets having payloads in the system memory may be initially stored in the send queue of one queue pair associated with the target node to which the packet is directed. From the send queue of the queue pair, the message engine cluster 70 would interpret the work request, determine the number of packets needed for the work request, including the number of headers and payload (if any) for each packet, and then distribute the work to generate the headers and request the payload to the header engine 80 and payload engine 82, respectively.

In Infiniband embodiments, there may be one pair of header and payload FIFOs for all queue pairs. Alternatively, there may be a separate pair of header and payload FIFOs for one or more groups of queue pairs. In described implementations, the clusters that generated the packets to transmit are implemented in hardware logic. In alternative implementations, some or all of the clusters may be implemented as code loaded into memory executed by a processor.

In described embodiments, different clocks (the core clock 86 and host clock 90) were used to write the header and payload to their respective FIFO queues 76 and 78, and a different clock (the transmit clock 88) is used to read headers and payload from the FIFO queues. In alternative embodiments, a different combination of clocks may be used to perform the read and write operations with respect to the header and payload FIFO queues.

In certain embodiments, the channel adaptor may be included in a host computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the channel adaptor may be configured to transmit data across a cable connected to a port on the network adaptor. Alternatively, the network adaptor embodiments may be configured to transmit data over a wireless network or connection, such as wireless LAN, Bluetooth, Wireless Fidelity (Wi-Fi), etc.

The channel adaptors may be inserted into an adaptor slot in the host system 2, such as a Peripheral Component Interconnect (PCI) expansion slot or the channel adaptors may be integrated components on the motherboard of the host 2.

The illustrated operations of FIGS. 4 and 5 illustrate the packet construction operations occurring in a certain order and performed by specific components. In alternative embodiments, certain operations may be performed in a different order, modified or removed, and/or performed by different components in the channel adaptor than those shown. Moreover, steps may be added to the above described logic and still conform to the described embodiments. Further, operations described herein may occur sequentially or certain operations may be processed in parallel. Yet further, operations may be performed by a single processing unit, multi-processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for constructing a packet comprising:
   receiving a request to construct one packet, including information on at least one header and a payload to include in the packet;
   generating the at least one header for the received request;
   writing the generated at least one header in a first queue;
   requesting the payload to include in the packet;
   writing the received payload to a second queue;
   reading the generated at least one header and payload from the first and second queues;
   including the read at least one header and payload in the packet;
   in response to constructing one packet, determining whether all headers and payload for a next packet according to a packet ordering are buffered in the first and second queues; and
   constructing the next packet in response to determining that all headers and payload for the next packet are buffered in the first and second queues.

2. The method of claim 1, further comprising:
   transmitting the constructed packet to a target node.

3. The method of claim 1, further comprising:
   signaling header complete in response to writing one header to the first queue; and
   signaling payload complete in response to writing the payload to the second queue.

4. The method of claim 3, wherein the at least one header and payload are included in the packet in response to receiving signals that all headers for the packet to construct are written to the first queue and the payload for the packet to construct is written to the second queue.

5. The method of claim 4, wherein writing the header and signaling header complete are performed by a header engine, wherein writing the received payload and signaling payload complete are performed by a payload engine, and wherein including the read at least one header and payload in the packet are performed by a completion engine in response to receiving the signals.

6. The method of claim 1, wherein headers and payload for a first packet may be buffered in the first and second queues before a second packet preceding the first packet is constructed.

7. The method of claim 1, further comprising:
accessing the payload from a system memory in response to receiving the request, wherein the accessed payload is written to the second queue.

8. The method of claim 1, wherein one packet to construct may include at least one header and no payload, and wherein the at least one generated header is included in the packet in response to receiving signals indicating that the headers have been generated and determining that the packet to construct does not include payload.

9. A method for constructing a packet comprising:
receiving a request to construct one packet, including information on at least one header and a payload to include in the packet;
generating the at least one header for the received request;
writing the generated at least one header in a first queue;
requesting the payload to include in the packet;
writing the received payload to a second queue;
reading the generated at least one header and payload from the first and second queues,
wherein writing the at least one header to the first queue, writing the payload to the second queue, and reading the at least one header and payload from the first and second queues are performed in different clock domains; and
including the read at least one header and payload in the packet.

10. The method of claim 9, wherein headers are written to the first queue in a first clock domain, payloads are written to the second queue in a second clock domain, and headers and payloads are read from the first and second queues, respectively, in a third clock domain.

11. A method for constructing a packet comprising:
receiving a request to construct one packet, including information on at least one header and a payload to include in the packet;
generating the at least one header for the received request;
writing the generated at least one header in a first queue;
requesting the payload to include in the packet;
writing the received payload to a second queue;
reading the generated at least one header and payload from the first and second queues;
including the read at least one header and payload in the packet;
queuing a work request including the request to construct the packet in a send queue that is in one of a plurality of queue pairs, wherein each queue pair includes one send queue and one receive queue; and
interpreting the work request to determine the at least one header and payload for the packet to construct, wherein the determined at least one header is generated and the determined payload is requested.

12. A channel adaptor, wherein the channel adaptor includes logic to enable the channel adaptor to perform:
receive a request to construct one packet, including information on at least one header and a payload to include in the packet;
generate the at least one header for the received request;
write the generated at least one header in a first queue;
request the payload to include in the packet;
write the received payload to a second queue;
read the generated at least one header and payload from the first and second queues;
include the read at least one header and payload in the packet;
in response to constructing one packet, determining whether all headers and payload for a next packet according to a packet ordering are buffered in the first and second queues; and
constructing the next packet in response to determining that all headers and payload for the next packet are buffered in the first and second queues.

13. The channel adaptor of claim 12, wherein the channel adaptor logic is further capable of causing the channel adaptor to perform:
transmitting the constructed packet to a target node.

14. The channel adaptor of claim 12, wherein the channel adaptor logic is further capable of causing the channel adaptor to perform:
signaling header complete in response to writing one header to the first queue; and
signaling payload complete in response to writing the payload to the second queue.

15. The channel adaptor of claim 14, wherein the at least one header and payload are included in the packet in response to receiving signals that all headers for the packet to construct are written to the first queue and the payload for the packet to construct is written to the second queue.

16. The channel adaptor of claim 15, further comprising:
a header engine to perform the operations of writing the header and signaling header complete;
a payload engine to perform the operations of writing the received payload and signaling payload complete; and
a completion engine to perform the operations of including the read at least one header and payload in the packet in response to receiving the signals.

17. The channel adaptor of claim 12, wherein headers and payload for a first packet may be buffered in the first and second queues before a second packet preceding the first packet is constructed.

18. The channel adaptor of claim 12, wherein the channel adaptor logic further enables the channel adaptor to perform:
accessing the payload from a system memory in response to receiving the request, wherein the accessed payload is written to the second queue.

19. The channel adaptor of claim 12, wherein writing the at least one header to the first queue, writing the payload to the second queue, and reading the at least one header and payload from the first and second queues are performed in different clock domains.

20. The channel adaptor of claim 19, wherein headers are written to the first queue in a first clock domain, payloads are written to the second queue in a second clock domain, and headers and payloads are read from the first and second queues, respectively, in a third clock domain.

21. The channel adaptor of claim 12, wherein the channel adaptor logic is further capable of causing the channel adaptor to perform:
queuing a work request including the request to construct the packet in a send queue that is in one of a plurality of queue pairs, wherein each queue pair includes one send queue and one receive queue; and interpreting the work request to determine the at least one header and payload for the packet to construct, wherein the determined at least one header is generated and the determined payload is requested.

22. A system, comprising:

a host processor;

a magnetic storage medium;

a memory in communication with the host processor and including a payload to transmit in a packet, wherein a copy of the payload is stored in the magnetic storage medium; and a channel adaptor in communication with the memory, wherein the channel adaptor includes logic to enable the channel adaptor to perform:

receiving a request to construct one packet, including information on at least one header and a payload to include in the packet;

generating the at least one header for the received request;

writing the generated at least one header in a first queue;

requesting the payload to include in the packet;

writing the received payload to a second queue;

reading the generated at least one header and payload from the first and second queues;

including the read at least one header and payload in the packet;

in response to constructing one packet, determining whether all headers and payload for a next packet according to a packet ordering are buffered in the first and second queues; and constructing the next packet in response to determining that all headers and payload for the next packet are buffered in the first and second queues.

23. The system of claim 22, wherein headers and payload for a first packet may be buffered in the first and second queues before a second packet preceding the first packet is constructed.

24. An article of manufacture comprising at least one of a hardware device having hardware logic and a computer readable storage medium having computer executable codes for performing operations to construct a packet, the operations comprising:

receiving a request to construct one packet, including information on at least one header and a payload to include in the packet;

generating the at least one header for the received request;

writing the generated at least one header in a first queue;

requesting the payload to include in the packet;

writing the received payload to a second queue;

reading the generated at least one header and payload from the first and second queues;

including the read at least one header and payload in the packet;

in response to constructing one packet, determining whether all headers and payload for a next packet according to a packet ordering are buffered in the first and second queues; and constructing the next packet in response to determining that all headers and payload for the next packet are buffered in the first and second queues.

25. The article of manufacture of claim 24, wherein the operations further comprise:

transmitting the constructed packet to a target node.

26. The article of manufacture of claim 24, wherein the operations further comprise:

signaling header complete in response to writing one header to the first queue; and signaling payload complete in response to writing the payload to the second queue.

27. The article of manufacture of claim 26, wherein the at least one header and payload are included in the packet in response to receiving signals that all headers for the packet to construct are written to the first queue and the payload for the packet to construct is written to the second queue.

28. The article of manufacture of claim 27, wherein writing the header and signaling header complete are performed by a header engine, wherein writing the received payload and signaling payload complete are performed by a payload engine, and wherein including the read at least one header and payload in the packet are performed by a completion engine in response to receiving the signals.

29. The article of manufacture of claim 24, wherein headers and payload for a first packet may be buffered in the first and second queues before a second packet preceding the first packet is constructed.

30. The article of manufacture of claim 24, wherein the operations further comprise:

accessing the payload from a system memory in response to receiving the request, wherein the accessed payload is written to the second queue.

31. The article of manufacture of claim 24, wherein writing the at least one header to the first queue, writing the payload to the second queue, and reading the at least one header and payload from the first and second queues are performed in different clock domains.

32. The article of manufacture of claim 31, wherein headers are written to the first queue in a first clock domain, payloads are written to the second queue in a second clock domain, and headers and payloads are read from the first and second queues, respectively, in a third clock domain.

33. The article of manufacture of claim 24, wherein one packet to construct may include at least one header and no payload, and wherein the at least one generated header is included in the packet in response to receiving signals indicating that the headers have been generated and determining that the packet to construct does not include payload.

34. An article of manufacture comprising at least one of a hardware device having hardware logic and a computer readable storage medium having computer executable codes for performing operations to construct a packet, the operations comprising:

receiving a request to construct one packet, including information on at least one header and a payload to include in the packet;

generating the at least one header for the received request;

writing the generated at least one header in a first queue;

requesting the payload to include in the packet;

writing the received payload to a second queue;

reading the generated at least one header and payload from the first and second queues;

including the read at least one header and payload in the packet;

queuing a work request including the request to construct the packet in a send queue that is in one of a plurality of queue pairs, wherein each queue pair includes one send queue and one receive queue; and interpreting the work request to determine the at least one header and payload for the packet to construct, wherein the determined at least one header is generated and the determined payload is requested.

* * * * *